No. 819,374. PATENTED MAY 1, 1906.
E. C. F. OTTO.
ELASTIC TIRE FOR ROAD WHEELS.
APPLICATION FILED MAR. 7, 1905.

2 SHEETS—SHEET 1.

Witnesses
N. M. Kuehne
John A. Percival

Inventor
Edward Charles Frederick Otto
By Richards
Attorneys

No. 819,374. PATENTED MAY 1, 1906.
E. C. F. OTTO.
ELASTIC TIRE FOR ROAD WHEELS.
APPLICATION FILED MAR. 7, 1905.
2 SHEETS—SHEET 2.
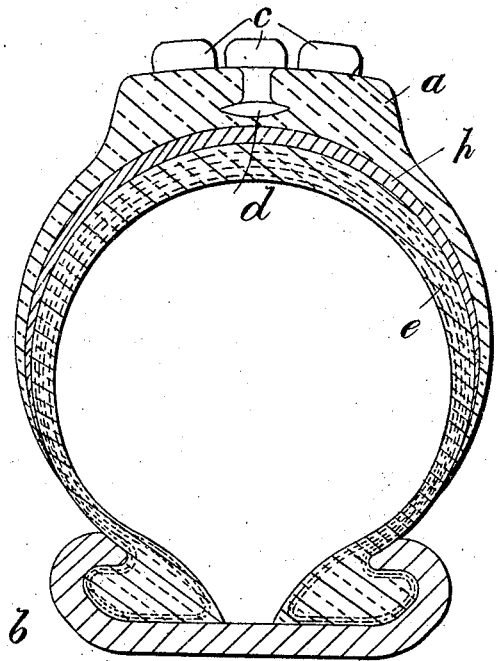
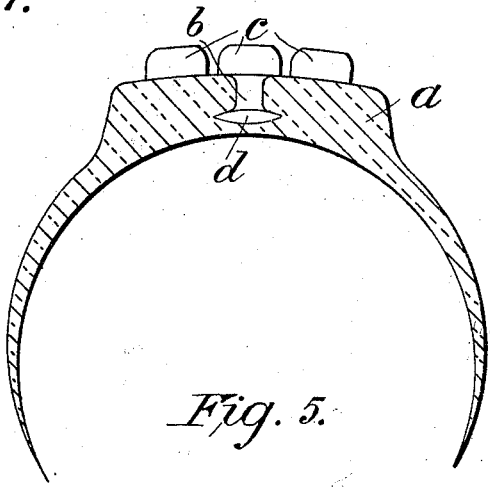
Witnesses
Inventor
Edward Charles Frederick Otto
Attorneys

UNITED STATES PATENT OFFICE.

EDWARD CHARLES FREDERICK OTTO, OF LONDON, ENGLAND, ASSIGNOR OF ONE-HALF TO GEORGE FREDERICK RICHARDSON, OF LEE, ENGLAND.

ELASTIC TIRE FOR ROAD-WHEELS.

No. 819,374.     Specification of Letters Patent.     Patented May 1, 1906.

Application filed March 7, 1905. Serial No. 248,933.

*To all whom it may concern:*

Be it known that I, EDWARD CHARLES FREDERICK OTTO, engineer, a subject of the King of Great Britain and Ireland, residing at 108 Chestnut Grove, Balham, London, England, have invented certain new and useful Improvements in Elastic Tires for Motor and other Road Vehicles, of which the following is a specification.

The present invention relates to improvements in elastic tires for motor and other road vehicles, the object being to provide a rubber tire with a tread of great resiliency and durability and which will effectually prevent side slip or skidding of the vehicle.

The invention consists in embedding in the tread of the rubber tire, while the latter is in its plastic state prior to vulcanization, studs of metal or fiber, the studs, if of metal other than brass, being coated with brass, whereby on vulcanizing the tire-tread the studs become chemically united to the rubber.

Figure 1:
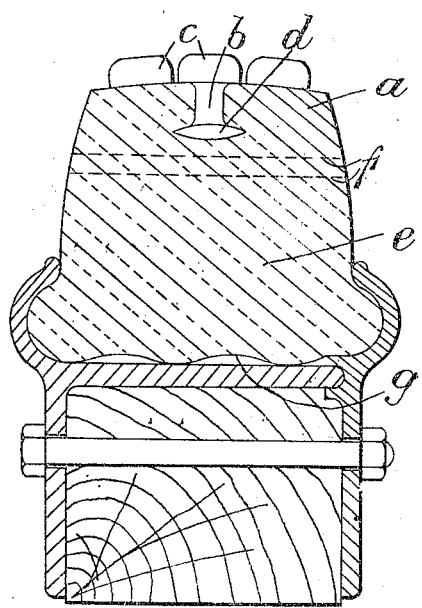
Figure 3:
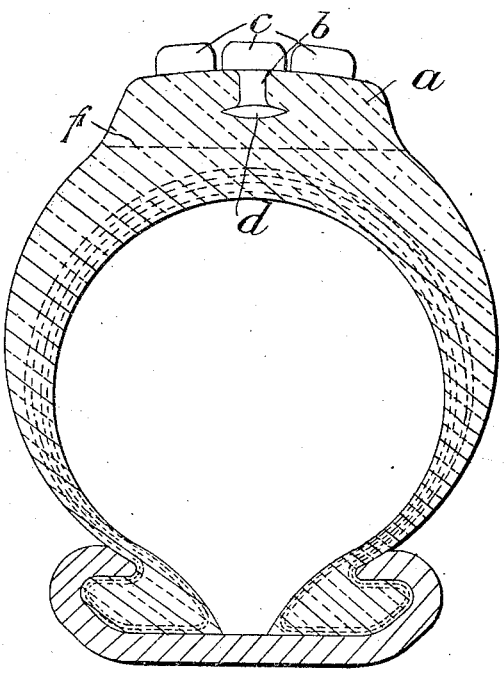
Figure 2:
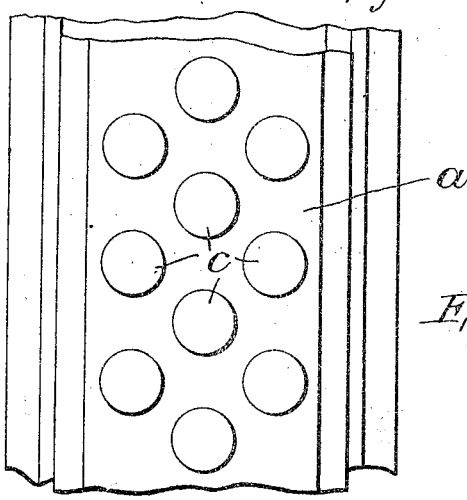

Referring now to the accompanying drawings, Figure 1 is a sectional view of a solid-rubber tire with a tread constructed according to this invention. Fig. 2 is a plan of the same. Figs. 3 and 4 are cross-sectional views of pneumatic tires with this invention applied in two ways. Fig. 5 is a cross-section of a separate rubber band with the invention applied. Figs. 6 and 7 are detached views of two forms of studs.

In carrying the invention into effect in one manner (shown in Figs. 1 and 2) applied to a solid tire I embed in the tread $a$ of the tire $e$ while it is in its plastic state—that is, prior to vulcanization—studs $b$, of metal, which are preferably shaped with heads $c$ and enlarged inner ends $d$, which are suitably curved or rounded, as shown in Fig. 1.

In manufacturing the tire the tread portion $a$ and the tire proper, $e$, may be separately molded, the studs being then embedded in the tread, which is subsequently placed over the tire proper, the whole tire being then vulcanized at one operation, whereby the tread and the tire proper are unified without damaging the canvas $f$, and the studs $b$ are chemically united in the tread of the tire by this latter process.

In cases where the studs are made of metal other than brass it is most important that they shall be coated with brass on the surfaces which come in contact with the rubber before being inserted in the plastic material, so that the chemical union of the studs with the rubber may take place. This brass coating may be effected in any convenient manner, such as by electrolytic deposition.

The studs may be of any convenient form that will offer a large surface for vulcanization, and it is preferable to construct them so that a mechanical attachment to the rubber is provided, as well as the chemical union to the rubber resulting from vulcanization.

In Figs. 6 and 7 two convenient forms of stud are shown, the former having a screwed shank and the latter a plain one, which, if desired, may be provided with grooves or recesses to increase its hold in the rubber.

The durability of the studs when made of iron or steel may be increased by case or otherwise hardening them before coating them with brass.

For the purpose of spreading the pressure of the studs under load over a large area of the tire proper the continuous strip or strips $f$ of canvas, webbing, or the like may be inserted in the rubber, so as to provide a resistance to the inward pressure of the stud, thus forcing into disfiguration a large amount of rubber lying not only directly around these studs, but for some distance around them.

It is preferable to provide a groove or grooves $g$ at the bottom of the tire in order that disfiguration of the tire may take place more easily.

It will be readily seen that this invention may be applied to pneumatic tires, the studs, as before, being embedded in the tread of the tire (see Fig. 3) while it is in its plastic state prior to vulcanization. The tire itself may be of any convenient construction, but is provided with a thickened tread $a$ for the reception of the studs and with a layer $f$ of canvas or the like for distributing the pressure of the studs. When vulcanizing the tire, which may be effected in one operation, the studs become securely vulcanized to the adjacent rubber.

In applying this invention to a pneumatic tire constructed of several parts and shown in Fig. 4 the studs are vulcanized into a rubber tread, which is vulcanized by a cold process in any usual manner to the rubber tire. A strip or layer of leather may be interposed to distribute the pressure of the studs on the tire proper and to prevent puncture of the tire when in use.

Instead of a strip or layer of leather, canvas or the like may be employed, and in this case the tread may be vulcanized to the tire proper by a hot process.

The invention may very conveniently be applied to separate covers or treads for use on existing tires, in which case the studs are embedded in the rubber of the tread when it is in its plastic condition and are vulcanized therein when the separate tread is vulcanized. A non-skidding tread adapted to be stuck or fastened to existing tires is thus provided.

In some cases the studs may be made of hard fiber turned to the required form; but it is preferred to employ iron or steel studs on account of their superior strength and durability.

By means of this invention it is possible to produce tires with a tread of great resiliency and durability and which effectually prevent a side slip of the vehicle. The union between the studs and rubber is perfect and the studs are not liable to work loose and come out. Consequently water cannot pass into the tire around the shanks of the studs.

Having thus described my invention, what I claim as new, and desire to secure by Letters Patent, is—

1. A rubber tire having brass-coated metallic studs vulcanized into its tread, substantially as described.

2. A rubber tire having studs vulcanized into its tread, the studs having bases embedded in the tread in order to distribute the pressure, substantially as described.

3. Rubber tires and the like having in combination a body part of rubber, and metallic non-skidding studs vulcanized into said body part, substantially as described.

4. Rubber tires and the like having in combination a body part of rubber, brass-coated studs vulcanized into said body part, substantially as described.

5. Solid-rubber tires and the like having in combination a body part of rubber, brass-coated studs vulcanized into said body part substantially as described.

6. Pneumatic tires having an outer cover in the tread of which studs are vulcanized substantially as described.

7. A separate rubber tread for pneumatic tires in which tread studs are vulcanized, substantially as described.

8. As an article of manufacture, a rubber tire, having a tread of rubber, brass-coated studs let into said tread while the rubber is in its plastic state prior to vulcanization and subsequently vulcanized therein, substantially as described.

9. A tire having a rubber body, a rubber tread, a pressure-distributing strip interposed between the rubber body and the rubber tread, brass-coated non-skidding studs vulcanized into said tire, substantially as described.

In testimony whereof I have signed my name to this specification in the presence of two subscribing witnesses.

EDWARD CHARLES FREDERICK OTTO.

Witnesses:
ALBERT E. PARKER,
FRANCIS J. BIGNELL.